UNITED STATES PATENT OFFICE.

ERNST VOETTER, OF UERDINGEN, GERMANY.

PROCESS OF PRINTING WITH SULFUR DYES.

SPECIFICATION forming part of Letters Patent No. 708,429, dated September 2, 1902.

Application filed June 13, 1902. Serial No. 111,584. (No specimens.)

*To all whom it may concern:*

Be it known that I, ERNST VOETTER, a subject of the King of Würtemberg, residing at Dusseldorfstrasse 36, Uerdingen-on-the-Rhine, Prussia, Germany, have invented a certain new and useful Process of Printing Textile Fabrics with Sulfur Dyes, of which the following is a specification.

The employment of sulfur dyes for printing purposes has been very limited heretofore, partly on account of the copper rollers being attacked and strongly acted upon by the sulfuret of alkali necessary for effecting the solution for producing deep shades and partly on account of only light shades being produced on printing without sulfuret of alkali. It has been attempted to avoid this difficulty by using sulfites or hyposulfites as a solvent in place of sulfuret of sodium or by coating the copper rollers with nickel. In the present invention this inconvenience is avoided by producing the sulfuret of alkali required for effecting the solution of the dyestuff in the steaming process only. This result is obtained by mixing the thickening agent with the necessary amount of sulfur in a finely-divided condition and also adding thereto carbonates of alkalies or caustic alkalies and the purified dyestuff or the dyestuff free from sulfuret of alkali. It is evident that the sulfur will only react with the alkali at an elevated temperature. Hence the paste is preferably prepared at as low a temperature as possible. Thus the process is preferably carried out by first mixing the dye, the sulfur, and the thickening agent intimately together, and, if necessary, heating the mixture, then allowing to cool, and finally adding the cold solution of the alkali after cooling and immediately before effecting the printing. By proceeding in this manner the copper rollers are not attacked in the least, and it becomes, therefore, possible by this simple process to employ the whole series of sulfur dyes extensively for printing purposes.

As instances of carrying the invention into effect, the following examples may be given:

*Example I—Table 1.*

| | |
|---|---|
| Auronal-black, purified........ | 10.0 parts. |
| Sulfur, precipitated........... | 2.5 parts. |
| Solution of potassium carbonate, 1:1........................ | 20.0 parts. |
| Mucilage gum-tragacanth, 1:20. | 50.0 parts. |
| Gum-arabic solution, 1:1...... | 10.0 parts. |
| Water........................ | 7.5 parts. |
| | 100.0 parts. |

*Example II—Table 2.*

| | |
|---|---|
| Sulfur-black, T extra.......... | 8.0 parts. |
| Solution carbonate of potash, 1:1 | 16.0 parts. |
| Mucilage gum-tragacanth, 1:20. | 50.0 parts. |
| Solution gum-arabic, 1:1...... | 10.0 parts. |
| Sulfur, precipitated........... | 2.0 parts. |
| Water........................ | 14.0 parts. |
| | 100.0 parts. |

*Example III—Table 3.*

| | |
|---|---|
| Katigenindigo B.............. | 10.0 parts. |
| Solution of potassium carbonate, 1:1........................ | 20.0 parts. |
| Mucilage gum-tragacanth, 1:20. | 60.0 parts. |
| Solution gum-arabic, 1:1...... | 3.0 parts. |
| Water........................ | 7.0 parts. |
| | 100.0 parts. |

The dyestuff, with the sulfur, is rubbed up with an equal quantity of water, mixing well, and then the thickening agent, and, last of all, the alkali solution is stirred in. Then the printing is effected, the goods are dried, steamed for half an hour at about three and three-quarters pounds pressure, washed well, and treated boiling in the soap-bath.

It is obvious that other proportions of the various ingredients different from those given above may be used. Besides salts such as copper or chromium salts, sulfites or hyposulfites may be added to the paste without interfering with the essential features of the process, which resides in the fact that the quantity of sulfuret of alkali required for the solution of the dyestuff is formed during the steaming process only.

What I claim, and desire to secure by Letters Patent of the United States, is—

1. The process for printing with sulfur dyes upon textile fabrics which consists in mixing dyestuff, free from sulfuret of alkali with sulfur and alkalies, printing the mixture upon a textile fabric and steaming and developing the dye upon the fabric.

2. The process for printing with sulfur dyes upon textile fabrics which consists in purifying the dyestuff, mixing the same with sulfur and carbonate of alkali, printing the mixture upon a fabric and steaming and developing the dyestuff upon the said fabric.

In witness whereof I have hereunto set my hand in presence of two witnesses.

ERNST VOETTER.

Witnesses:
CHAS. F. HENSLEY,
A. M. HENSLEY.